Nov. 15, 1966 H. P. A. SALAM 3,286,102

ELECTRIC CIRCUITS

Filed Dec. 19, 1963

United States Patent Office 3,286,102

Patented Nov. 15, 1966

3,286,102
ELECTRIC CIRCUITS

Hassan Paddy Abdel Salam, London, England, assignor to English Electric-Leo Computers Limited, London, England Filed Dec. 19, 1963, Ser. No. 331,851
Claims priority, application Great Britain, Dec. 28, 1962, 43,295/62
2 Claims. (Cl. 307—88.5)

Figure 1:
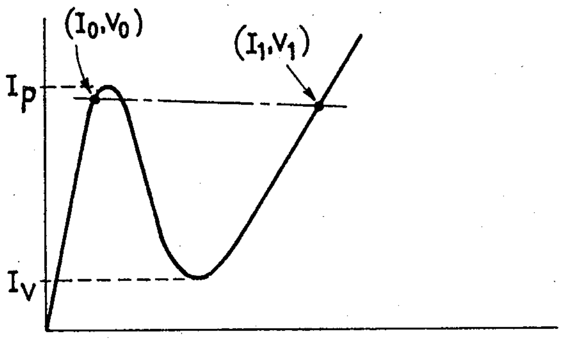

This invention relates to electric circuits and apparatus for transferring and storing temporarily electric signals which represent data in digital form.

According to the present invention an electric signal transfer means includes a plurality of first input terminals for receiving input potentials from a plurality of input signal sources, a plurality of second input terminals for receiving control voltage pulses from a control voltage source or sources, a plurality of separate electric circuits for connecting corresponding first and second input terminals, each such electric circuit including in series one of a plurality of similar input windings of a pulse transformer and a unidirectional current conduction device for preventing the flow of current through the associated transformer input winding towards the associated first input terminal, the transformer having an output winding in which an output signal representing a predetermined binary state is induced on application of a control voltage pulse to any selected second input terminal only when the input voltage signal applied to the associated first input terminal is of a pedetermined one of two alternative values, which value represents the aforesaid binary state.

According to a preferred feature of the invention an electric apparatus includes such an electric signal transfer means and an electric bi-stable storage device having an input circuit connected for energisation by the output winding of the pulse transformer and an output circuit for providing an output potential which is indicative of the state of the device, the bi-stable device being set automatically to a condition representative of the aforesaid predetermined binary state by an output signal induced in the pulse transformer output winding.

The bi-stable storage device may include a tunnel diode and a biasing circuit for causing a bias current to flow in the tunnel diode having a mangitude such that the diode may operate at either of two alternative stable voltage states, and in such a case the induction of an output signal in the transformer output winding is effective to momentarily modify the current flowing in the tunnel diode whereby to cause the diode to transfer from one voltage state to that voltage state which is representative of the aforesaid predetermined binary state.

Preferably, the tunnel diode is connected in the collector-emitter circuit of a transistor, and the output winding of the pulse transformer is connected in the base-emitter circuit of the transistor so that the induction of an output signal in the transformer output winding modifies the current flow through the tunnel diode.

Alternatively, the output winding of the transformer may be connected in series with the tunnel diode in a closed circuit which also includes a diode for preventing modification of the current flowing in the tunnel diode when at the termination of a control pulse the magnetic flux set up in the transformer collapses.

Figure 2:
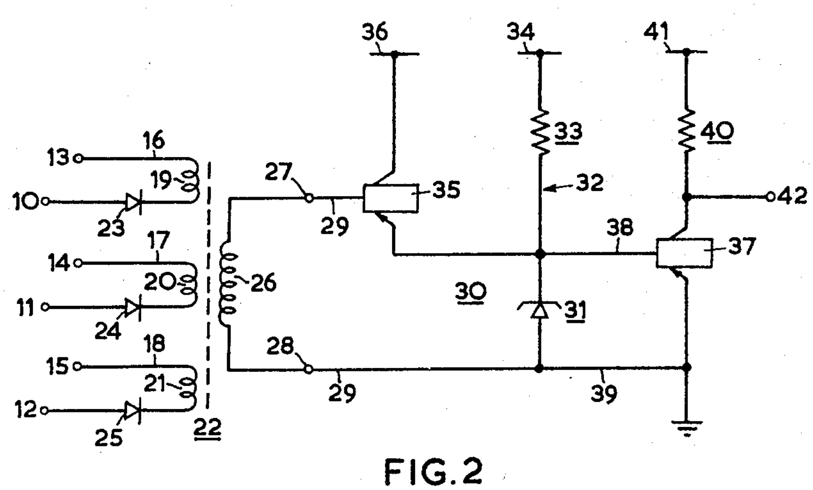

One electric signal transfer and storage apparatus according to the present invention for use in an electric digital computer will now be described by way of example and with reference to the accompanying drawing in which:

FIG. 1 shows graphically an electrical characteristic of a tunnel diode incorporated in the apparatus, the characteristic showing the manner in which the voltage developed across the tunnel diode varies with variation of the current flowing through the diode; and FIG. 2 shows diagrammatically the electric circuit connections of the apparatus.

Referring now to the drawings, the apparatus includes three first input terminals 10, 11, 12 for receiving input electric potential signals from input signal sources (not shown), which may be bi-stable storage devices in various registers of a digital computer, and three second input terminals 13, 14, 15 for receiving control potential pulses from a control pulse source.

Three similar but separate electric circuits 16, 17, 18 connect corresponding first and second input terminals, and each such circuit includes in series an input winding 19, 20 or 21 of a pulse transformer 22, and a silicon diode 23, 24 or 25. Each such diode is connected in a sense such as to prevent the flow of current through the associated transformer input winding towards the associated first input terminal and input signal source.

The pulse transformer 22 has an output winding 26 connected between output terminals 27, 28.

The apparatus so far described constitutes a signal transfer means for effecting transfer of electric potential signals representing alternative binary states from the first input terminals 10, 11, 12 to the output terminals 27, 28.

Connected to the output terminals 27, 28 is an input circuit 29 of a bi-stable storage device 30 which incorporates as a bi-stable storage element a tunnel diode 31. The latter is provided with a biasing circuit 32 for providing a bias current for enabling the tunnel diode to operate alternatively at either of two stable voltage states, as will be explained later. The biasing circuit includes a resistor 33 through which the tunnel diode is connected to a source of negative bias potential 34.

The bi-stable storage device also includes a p-n-p type transistor 35 which has its emitter-base circuit connected in series with the tunnel diode in the aforesaid input circuit 29. The collector electrode of the transistor is connected with a suitable source 36 of constant negative potential, so that the tunnel diode functions as an emitter load for the transistor, which itself thus functions as an emitter-follower.

The voltage developed across the tunnel diode constitutes the output potential signal of the bi-stable storage device, and this output signal is applied to the base-emitter circuit of a second transistor 37 by circuit connections 38, 39. This second transistor has a collector circuit load resistor 40 connecting the collector with a suitable source 41 of constant negative potential, and an output terminal 42 for providing as an output signal of the complete apparatus the collector potential of the transistor.

The second transistor 37 acts as an inverting device for providing an output signal which has the same phase relationship as the signal applied to the relevant first input terminal 10, 11 or 12.

The operation of the apparatus will now be described. From the tunnel diode characteristic shown in FIG. 1 it will be appreciated that for values of tunnel diode current lying between the "peak" value $I_p$ and the "valley" value $I_v$ the voltage developed across the diode may be alternatively of a relatively high value or a very low value, and that for any value of current lying between the two above-mentioned values the diode can operate stably in the high voltage state or in the low voltage state. These two operating states lie on the positive resistance portions of the characteristic.

Thus to cause the tunnel diode 31 to operate as a bi-stable storage element in the present apparatus, the biasing resistor 33 is chosen so that the tunnel diode carries initially a current $I_0$, the voltage drop across the tunnel diode then being $V_0$, and the operating point being on the left hand positive resistance portion of the characteristic. This voltage, which is of near zero value, appearing at the output connections 38, 39 is representative of an output ZERO binary state.

If the current flowing in the tunnel diode is momentarily raised to a value greater than the "peak" value $I_p$, for example by allowing transistor 35 to conduct, the operating point of the tunnel diode automatically moves to the right hand positive resistance portion of the characteristic, so that on cessation of the additional current flow through transistor 35 the operating point settles at a second stable operating point on the right hand positive resistance portion of the characteristic, at which the current in the tunnel diode has fallen slightly to a new value $I_1$ due to the increased resistance of the tunnel diode. In this second stable state the voltage developed across the tunnel diode is $V_1$ (0.5 volt), and this voltage appearing at the output connections 38, 39 of the bi-stable storage element is representative of an output UNIT binary state.

To reset such a tunnel diode from the UNIT binary state to the ZERO binary state, the current through the diode has to be momentarily reduced to a value below the value $I_v$, so that as the current increases again the diode settles at the low voltage stable state with a current flow of $I_0$.

To achieve the desired resetting action, the flow of tunnel diode current through the biasing circuit 32 is momentarily interrupted by resetting means not shown.

In operation a potential of near zero value applied to a first input terminal 10, 11 or 12, or developed at the output terminal 42, is representative of the UNIT binary state, whilst a potential of −2 volts at such terminals is representative of the ZERO binary state.

On resetting the tunnel diode to the low voltage ZERO state the transistor 37 is rendered non-conductive so that the output terminal 42 is held at the Zero state potential of −2 volts. In the absence of a control voltage pulse each second input terminal 13, 14 or 15 is held by the control voltage source at a potential of +1 volt, whereas the application of a control pulse to a second input terminal decreases the potential of that terminal to −1 volt.

It will therefore be appreciated that when a first input terminal is held at the Zero state potential (−2 volts), no current can flow in the associated transformer winding if the associated second input terminal is held at +1 volt, and that the application of a control pulse (−1 volt) to the associated second input terminal is also ineffective to establish a current flow in the associated transformer input winding, since under this condition the associated diode is likewise reverse-biased. Hence no E.M.F. is induced in the transformer output winding when a first input terminal is held at the ZERO state potential, and the transistor 35 thus remains in its quiescent non-conductive state, and the output terminal 42 at the ZERO state potential of −2 volts.

However, when a first input terminal is held at the UNIT state potential (of near zero value) the application of a control pulse to the associated second input terminal is effective to establish a temporary current flow in the associated transformer input winding, and hence to give rise to a voltage pulse in the transformer output winding. As a result the transistor 35 is rendered temporarily conductive to increase the current flow in the tunnel diode temporarily above the value $I_p$. The tunnel diode thereupon assumes its high voltage or UNIT stable operating state, and causes the transistor 37 to become conductive whereby to raise the potential appearing at the output terminal 42 to the UNIT state potential.

Thus by the application of a control pulse to any selected second input terminal after first resetting the tunnel diode, the input binary signal applied to the corresponding first input terminal can be transferred to the output terminal 42.

In the above described apparatus the tunnel diode necessitates the use in many cases of the second transistor 37 to invert the output signal of the tunnel diode, and thereby provide at the terminal 42 an output signal of the same sense as the input signal applied to the relevant first input terminal. In addition, this transistor provides additional power gain.

If desired the apparatus described above may be modified so as to enable it to transfer digital data signals from any other number of input signal sources, by adding (or subtracting as the case may be) an appropriate number of first and second input terminals, transformer input windings and associated diodes.

The above described apparatus offers the advantages, as compared with equivalent apparatus at present in use which uses simple AND and OR gates and other forms of bi-stable storage element, that fewer components are necessary for achieving the desired transfer of digital data signals from any one of several input sources to a single output storage device.

I claim:

1. An electric digital transfer and storage device comprising a plurality of separate input circuits, a pulse transformer having a plurality of similar input windings and an output winding, a transistor having said output winding connected in the base-emitter circuit thereof, a tunnel diode connected in the emitter-collector circuit of said transistor, and a biasing circuit for causing a bias current to flow in the tunnel diode having a magnitude such that the tunnel diode may operate at either of two alternative stable states, each input circuit comprising one of a plurality of first input terminals for receiving input potentials from a plurality of input signal sources, one of a plurality of second input terminals for receiving control potential pulses from a control potential source, and one of said input windings and a unidirectional current conduction device connected in series between said first and second input terminals, such that an output signal representing a predetermined binary state is induced in the transformer output winding on application of a control potential pulse to any selected second input terminal only when the input potential signal applied to the associated first input terminal is of a predetermined one of two alternative values, which value represents the aforesaid binary state, induction of said output signal in the transformer output winding being automatically effective to momentarily modify the current flowing in the tunnel diode whereby to cause the tunnel diode to transfer from one potential state to that potential state which is representative of the aforesaid binary state, and output circuit means connected with the tunnel diode for producing as an output signal an electric potential dependent on the potential developed across the tunnel diode.

2. An electric apparatus according to claim 1 wherein the transistor has its emitter-collector circuit arranged electrically in parallel with the said biasing circuit so that the flow of current in the tunnel diode is temporarily increased when the transistor is rendered temporarily conductive by a pulse induced in the transformer output winding.

References Cited by the Examiner

UNITED STATES PATENTS

| | | | |
|---|---|---|---|
| 3,089,961 | 5/1963 | Overn at el. | 307—88.5 |
| 3,171,985 | 3/1965 | Freimanis | 307—88.5 |
| 3,194,981 | 7/1965 | Gubert | 307—88.5 |

OTHER REFERENCES

Amodei et al.: R.C.A. Technical Note No. 438, January 1961 (3 sheets, 1 sheet relied on).

ARTHUR GAUSS, *Primary Examiner.*

D. D. FORRER, *Assistant Examiner.*